United States Patent
Yamakawa et al.

(10) Patent No.: US 10,404,133 B2
(45) Date of Patent: Sep. 3, 2019

(54) ROTARY ELECTRIC MOTOR AND METHOD OF MANUFACTURING THE ROTARY ELECTRIC MOTOR

(71) Applicant: Mitsubishi Electric Corporation, Tokyo (JP)

(72) Inventors: Yukie Yamakawa, Tokyo (JP); Ryo Nabika, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 430 days.

(21) Appl. No.: 15/325,775

(22) PCT Filed: Sep. 30, 2014

(86) PCT No.: PCT/JP2014/075974
§ 371 (c)(1),
(2) Date: Jan. 12, 2017

(87) PCT Pub. No.: WO2016/051481
PCT Pub. Date: Apr. 7, 2016

(65) Prior Publication Data
US 2017/0170705 A1    Jun. 15, 2017

(51) Int. Cl.
*H02K 5/22* (2006.01)
*H02K 1/14* (2006.01)
(Continued)

(52) U.S. Cl.
CPC .......... *H02K 5/225* (2013.01); *H02K 1/146* (2013.01); *H02K 3/18* (2013.01); *H02K 3/522* (2013.01);
(Continued)

(58) Field of Classification Search
CPC .... H02K 3/522; H02K 5/225; H02K 15/0062; H02K 15/0068; H02K 2203/03;
(Continued)

(56) References Cited

U.S. PATENT DOCUMENTS 5,008,644 A * 4/1991 Cooper .............. H01F 5/04
336/192
7,764,157 B2 * 7/2010 Schulz .............. H01F 5/02
336/198
(Continued)

FOREIGN PATENT DOCUMENTS

JP    54-1870 A     1/1979
JP    60-34741 U    3/1985
(Continued)

OTHER PUBLICATIONS

International Search Report of the International Searching Authority dated Dec. 22, 2014 for the corresponding international application No. PCT/JP2014/075974 (and English translation).

*Primary Examiner* — Quyen P Leung
*Assistant Examiner* — Minki Chang
(74) *Attorney, Agent, or Firm* — Posz Law Group, PLC (57) ABSTRACT

A rotary electric motor includes an annular stator, a rotor rotatably held on an inner circumferential side of the stator, a plurality of stator cores forming the stator, insulators attached to the stator cores and formed of an insulating material, coils wound around the insulators, and a plurality of terminals to which coil terminal lines of the coils are connected. Each of the terminals includes at least two protrusions protruding from a substrate. The at least two protrusions are formed of a permanent press-fitting portion for press-fitting one of the terminals into the corresponding one of the insulators and a temporary press-fitting portion for temporarily press-fitting the one of the terminals when the corresponding one of the coil terminal lines is joined to the one of the terminals with solder.

8 Claims, 5 Drawing Sheets

(51) Int. Cl.
*H02K 3/18* (2006.01)
*H02K 15/00* (2006.01)
*H02K 3/52* (2006.01)
*H02K 7/14* (2006.01)
*H02K 1/18* (2006.01)

(52) U.S. Cl.
CPC ............ *H02K 7/14* (2013.01); *H02K 15/0062* (2013.01); *H02K 1/148* (2013.01); *H02K 1/185* (2013.01); *H02K 2203/06* (2013.01); *H02K 2203/12* (2013.01)

(58) Field of Classification Search
CPC ........ H02K 15/06; H02K 15/09; H02K 15/12; H01R 43/02; H01R 43/0235; H01R 43/20
USPC ........................................ 310/43, 71; 29/596
See application file for complete search history.

(56) References Cited

U.S. PATENT DOCUMENTS

| | | | | |
|---|---|---|---|---|
| 10,263,487 B2 * | 4/2019 | Firat | ...................... | H02K 3/522 |
| 2009/0127964 A1 * | 5/2009 | Yumoto | ................. | H02K 3/522 |
| | | | | 310/195 |
| 2013/0033352 A1 * | 2/2013 | Wo | ....................... | H01F 27/327 |
| | | | | 336/192 |

FOREIGN PATENT DOCUMENTS

| | | |
|---|---|---|
| JP | 1-038888 Y2 | 11/1989 |
| JP | 2009-118615 A | 5/2009 |

\* cited by examiner

ROTARY ELECTRIC MOTOR AND METHOD OF MANUFACTURING THE ROTARY ELECTRIC MOTOR

CROSS REFERENCE TO RELATED APPLICATION

This application is a U.S. national stage application of PCT/JP2014/075974 filed on Sep. 30, 2014, the contents of which are incorporated herein by reference.

TECHNICAL FIELD

The present invention relates to a rotary electric motor including terminals connecting coils of a stator to an external power supply, and a method of manufacturing the rotary electric motor.

BACKGROUND ART

A driving part of a conventional rotary electric motor is formed of an annular stator and a rotor rotatably disposed on the inner circumferential side of the stator. The stator is formed of stator cores, which are magnetic materials. Insulators, which are insulating materials, are engaged with the stator cores. Coils through which an electric current flows are wound around the insulators, and terminals connected to terminal lines of the coils are inserted into terminal engagement holes of the insulators. The terminals are connected to an external power supply such as a three-phase power supply, and electric power is supplied to the coils.

As disclosed in, for example, Patent Literature 1, such a terminal of the rotary electric motor includes an external-power-supply connection portion to which a power supply is connected, a tie portion to which the terminal line of each coil is connected, and a press-fitting portion for attachment to an insulator.

The terminal is secured in a manner in which the press-fitting portion is press-fitted into the terminal engagement hole of the insulator. After the coil terminal line is tied to the tie portion of the terminal, the terminal is connected to the coil in a manner in which the tie portion is immersed into a solder bath.

CITATION LIST

Patent Literature

Patent Literature 1: Japanese Examined Utility Model Registration Application Publication No. 1-038888

SUMMARY OF INVENTION

Technical Problem

In the case where the stator of a conventional rotary electric motor is molded with a resin, the tie portions of the terminals to which the terminal lines of the coils are connected are buried in a resin molding material, and the external-power-supply connection portions protrude from the resin molding material.

In the case where terminals in the shape illustrated in FIG. 1 in Patent Literature 1 are assembled and secured to the insulators of an annular stator and, in this state, the tie portions are immersed into a solder bath, solder is attached also to the external-power-supply connection portions because the tie portions are located near the insulators with respect to the external-power-supply connection portions. In this case, the thickness of the external-power-supply connection portions increases, and the external-power-supply connection portions cannot be covered by, for example, terminal caps during molding. In addition, in some cases, a connection failure occurs when the external-power-supply connection portions are connected to wires extending from an external power supply by using, for example, press-fit terminals. Accordingly, it is necessary to immerse the tie portions of the terminals into the solder bath one by one in a state in which the stator cores are not annularly assembled, and this takes a lot of time and effort.

In the case where the tie portions of terminals in the shape illustrated in FIG. 5 in Patent Literature 1 are immersed into a solder bath, the tie portions can be immersed into the solder bath at the same time and solder is not attached to the external-power-supply connection portions. However, it is necessary for the amount of a molding resin to be increased to bury the tie portions, which are located at a high position, in the molding material.

The present invention has been made to overcome the above problems, and an object of the present invention is to appropriately specify the shape of the terminals of a rotary electric motor and an attaching procedure to achieve an improvement in the quality of terminal portions of a stator that are resin molded and simplification of a manufacturing procedure.

Solution to Problem

A rotary electric motor of an embodiment of the present invention is a rotary electric motor including an annular stator, a rotor rotatably held on an inner circumferential side of the stator, a plurality of stator cores forming the stator, insulators attached to the stator cores and formed of an insulating material, coils wound around the insulators, and a plurality of terminals to which coil terminal lines of the coils are connected. Each of the terminals includes at least two protrusions protruding from a substrate. The at least two protrusions are formed of a permanent press-fitting portion for press-fitting one of the terminals into the corresponding one of the insulators and a temporary press-fitting portion for temporarily press-fitting the one of the terminals when the corresponding one of the coil terminal lines is joined to the one of the terminals with solder.

A method of manufacturing a rotary electric motor of an embodiment of the present invention is a method of manufacturing a rotary electric motor including stator cores, insulators attached to the stator cores, coils wound around the insulators, and a plurality of terminals to which terminal lines of the coils are connected. The method includes a step of temporarily securing the plurality of terminals to temporary securing protrusions of the insulators, a step of tying the terminal lines of the coils to tie portions of the plurality of terminals, a step of immersing the tie portions of the plurality of terminals into solder, a step of detaching the plurality of terminals from the temporary securing protrusions, a step of permanently securing the plurality of terminals to permanent securing protrusions of the insulators, and a step of burying the tie portions in a resin molding material with external-power-supply connection portions of the plurality of terminals exposed.

Advantageous Effects of Invention

According to the rotary electric motor and method of manufacturing a rotary electric motor of an embodiment of the present invention, the tie portions of the terminals to which the coil terminal lines in the stator are connected can be immersed into a solder bath at the same time for soldering, the external-power-supply connection portions of the terminals are exposed from the resin molding material of the stator with no solder attaching thereto, and the tie portions of the terminals are buried in the resin molding material. Accordingly, the quality of terminal portions of the stator can be improved, and simplification of the manufacturing procedure can be achieved.

DESCRIPTION OF EMBODIMENTS

Embodiment of the present invention will hereinafter be described with reference to the drawings. The present invention, however, is not limited to Embodiment described below.
Embodiment
<Structure>

Figure 1:
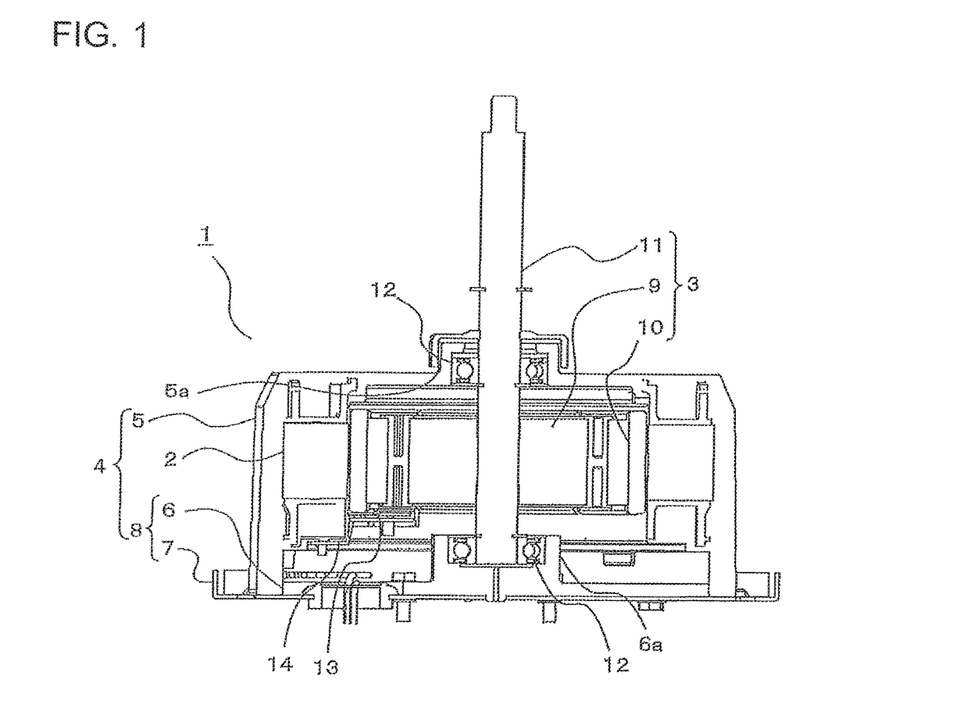
FIG. 1 is a sectional view of a rotary electric motor in Embodiment of the present invention.

FIG. 1 is a sectional view of a rotary electric motor 1 in Embodiment of the present invention.

Figure 2:
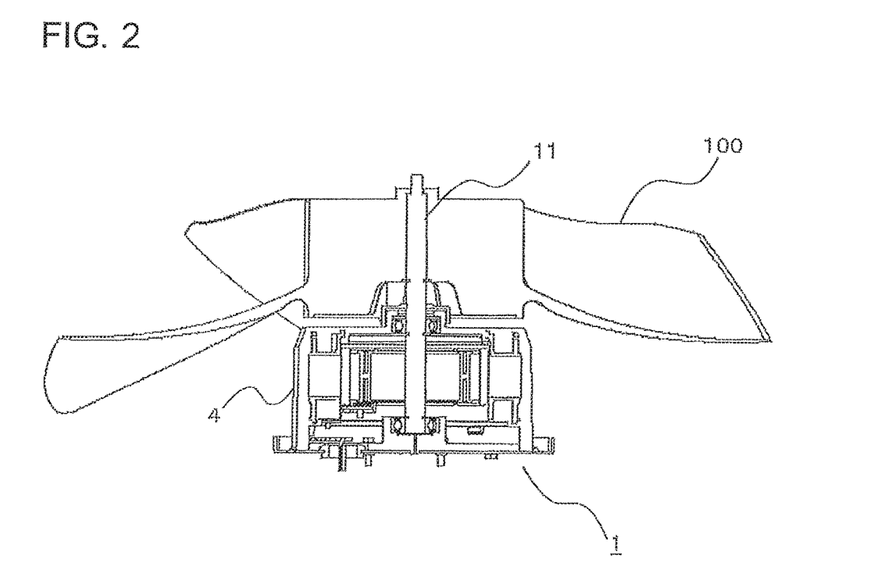
FIG. 2 is a sectional view of the rotary electric motor in Embodiment of the present invention in the case where the rotary electric motor is attached to a propeller fan.

FIG. 2 is a sectional view of the rotary electric motor 1 in Embodiment of the present invention in the case where a propeller fan 100 is attached to the rotary electric motor 1.

The rotary electric motor 1 in Embodiment is installed into, for example, an outdoor unit of an air-conditioning apparatus, and, as illustrated in FIG. 2, a brushless DC motor that drives the propeller fan 100 is assumed as the rotary electric motor 1.

In FIG. 1, the rotary electric motor 1 is generally formed of a cylindrical motor housing 4, an annular stator 2 incorporated inside the motor housing 4, and a rotor 3 that is rotatably accommodated on the inner circumferential side of the stator 2.

The motor housing 4 is formed of a casing 5 molded with a resin molding material integrally with the stator 2 and a bracket cover 8 formed of a metal plate bracket 7 and an insulation bracket 6 covering an opening side of the casing 5.

The rotor 3 holds permanent magnets 10 disposed on the outer circumferential side of a discoid rotating body 9 so as to face the inner circumference of the stator 2.

A shaft 11 is press-fitted along the central axis of the rotating body 9 so as to vertically extend through the rotating body 9. Pairs of bearings 12 are fitted on the shaft 11. One of the pairs of bearings 12 is secured to a bearing insertion portion 5a of the casing 5, and the other pair is secured to a bearing insertion portion 6a of the insulation bracket 6.

The bearing insertion portion 5a and the bearing insertion portion 6a are located on the central axis of the annular stator 2.

In the above structure, the rotor 3 is disposed on the inner circumferential side of the stator 2 and rotates coaxially with the annular stator 2.

A printed circuit board 13 on which a hall element that detects the position of the magnetic pole of the rotor 3 is mounted is secured to a printed circuit board holder 14 by, for example, welding. The printed circuit board holder 14 is disposed between an end surface of the rotor 3 and the insulation bracket 6.

The structure of the stator 2 will now be described.

Figure 3:
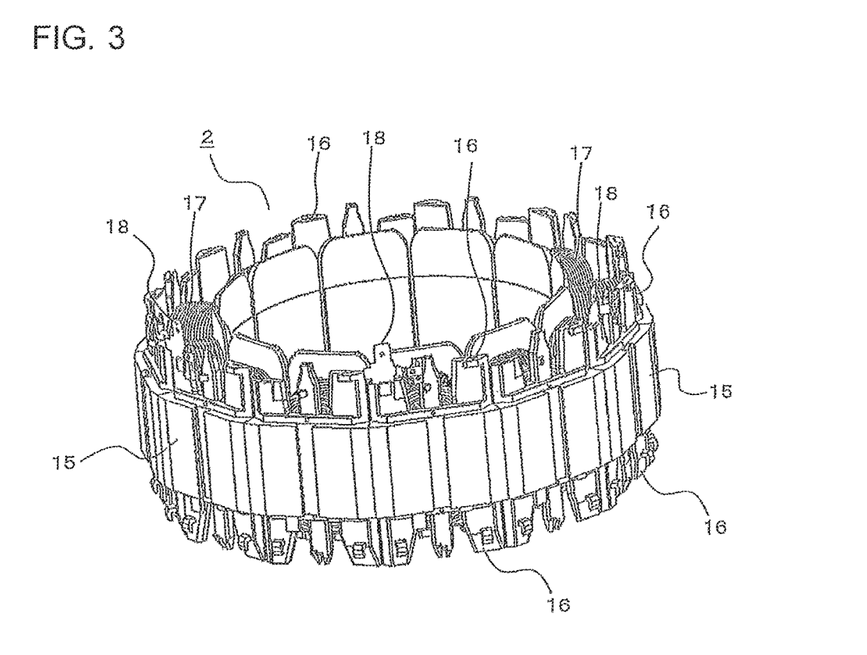
FIG. 3 is a perspective view of the entire stator in Embodiment of the present invention before resin molding.

FIG. 3 is a perspective view of the entire stator 2 in Embodiment of the present invention before resin molding.

The stator 2 is formed by combining stator cores 15 (12 stator cores in Embodiment) formed of a magnet material into an annular shape. Insulators 16 formed of an insulating material are attached to both end portions of the stator cores 15 in the axial direction of the stator 2. Coils 17 are wound around the insulators 16.

Three terminals 18 through which three-phase electric power is supplied to the coils 17 are attached to designated three insulators among the insulators 16.

Figure 4:
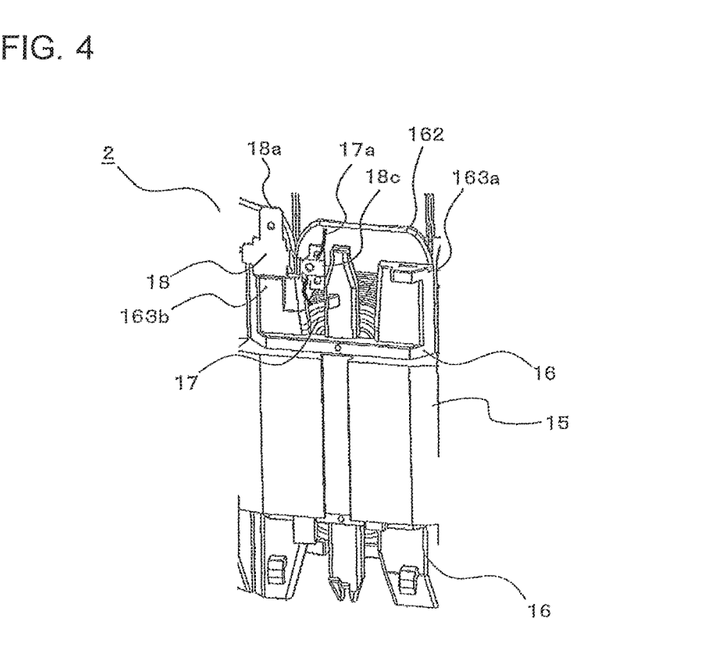
FIG. 4 is a perspective view of a principal part of the stator in Embodiment of the present invention before resin molding.

FIG. 4 is a perspective view of a principal part of the stator 2 in Embodiment of the present invention before resin molding.

Figure 5:
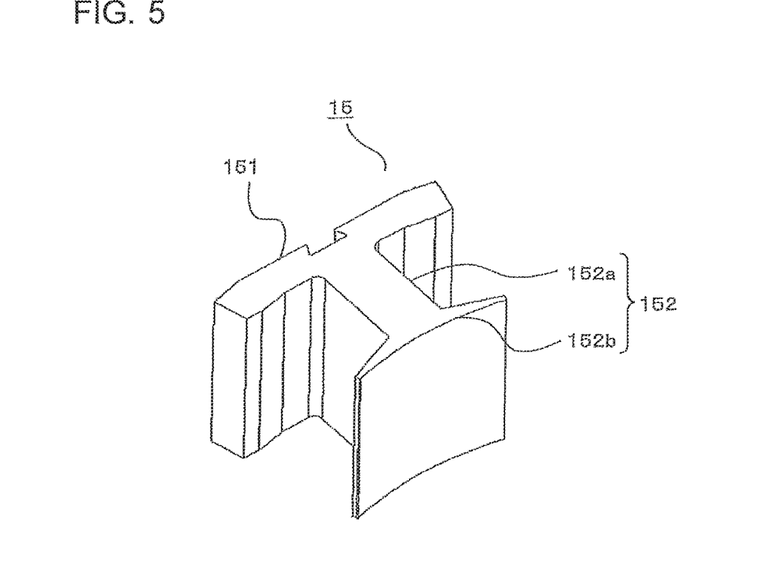
FIG. 5 is a perspective view of a stator core in Embodiment of the present invention.

FIG. 5 is a perspective view of one of the stator cores 15 in Embodiment of the present invention.

Figure 6:
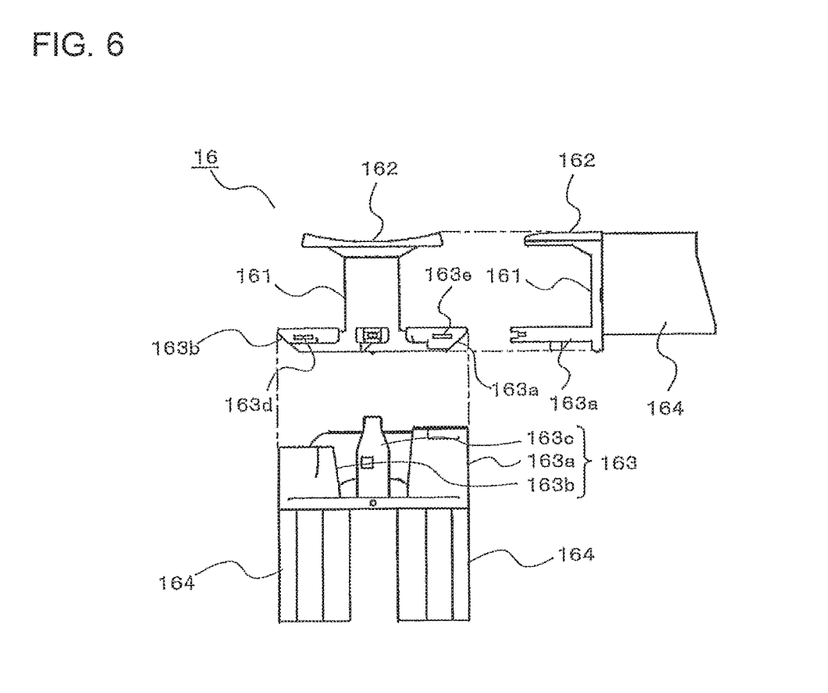
FIG. 6 is a plan view of an insulator in Embodiment of the present invention in three directions.

FIG. 6 is a plan view of one of the insulators 16 in Embodiment of the present invention in three directions.

In FIG. 4, a pair of the insulators 16 is fitted into upper and lower end portions of one of the stator cores 15.

As illustrated in FIG. 5, each stator core 15 is formed of a back yoke portion 151 located on the outer circumferential side of the stator 2 and a tooth portion 152 that protrudes from the back yoke portion 151.

The tooth portion 152 is formed of a tooth base 152a around which one of the coils 17 is wound with the corresponding one of the insulators 16 interposed therebetween and a tooth end portion 152b that is disposed so as to face the back yoke portion 151 located on the outer circumferential side of the stator 2 and serves as a partition for a space in which the coil 17 is accommodated on the inner circumferential side of the stator 2.

As illustrated in FIG. 6, each insulator 16 is formed of a substrate portion 161 that is in contact with the upper surface or lower surface of the stator core 15 with the insulator 16 fitted into the stator core 15, an inner-circumference protruding portion 162 that extends from the substrate portion 161 in the axial direction of the stator 2 on the inner circumferential side of the stator 2, outer-circumference protruding portions 163 that extend from the substrate portion 161 in the axial direction of the stator 2 on the outer circumferential side of the stator 2, and fitting portions 164 in contact with the tooth end portion 152b of the stator core 15 on the outer circumferential side, the back yoke portion 151 on the inner circumferential side, and side surfaces of the tooth base 152a.

The outer-circumference protruding portions 163 are formed of three protrusions: a temporary securing protrusion 163a having, at an end thereof, a temporary engagement hole 163e in which one of the terminals 18 is to be temporarily secured, a permanent securing protrusion 163b having, at an end thereof, a permanent engagement hole 163d in which the terminal 18 is finally secured, and a central protrusion 163c extending between the temporary securing protrusion 163a and the permanent securing protrusion 163b.

Regarding the height of the three outer-circumference protruding portions 163, the central protrusion 163c is the tallest, the temporary securing protrusion 163a is the next tallest, and the permanent securing protrusion 163b is the shortest.

The insulators 16 having such a shape are fitted into both end portions of the stator cores 15, and the coils 17 are wound around the substrate portions 161 of the insulators 16. Thus, as illustrated in FIG. 4, the coils 17 are received between the inner-circumference protruding portions 162 and outer-circumference protruding portions 163 of the insulators 16, and the insulators 16 insulate the stator cores 15 and the coils 17 from each other.

In FIG. 4, the terminal 18 is inserted into the permanent engagement hole 163d of the permanent securing protrusion 163b of the insulator 16. A coil terminal line 17a, which is an end of each coil 17, is connected to a tie portion 18c of the terminal 18 with, for example, solder. An external power supply is connected to an external-power-supply connection portion 18a of each terminal 18 by using, for example, a press-fit terminal to supply electric power to the coils 17.

The shape of the terminals 18 will now be described in detail.

Figure 7:
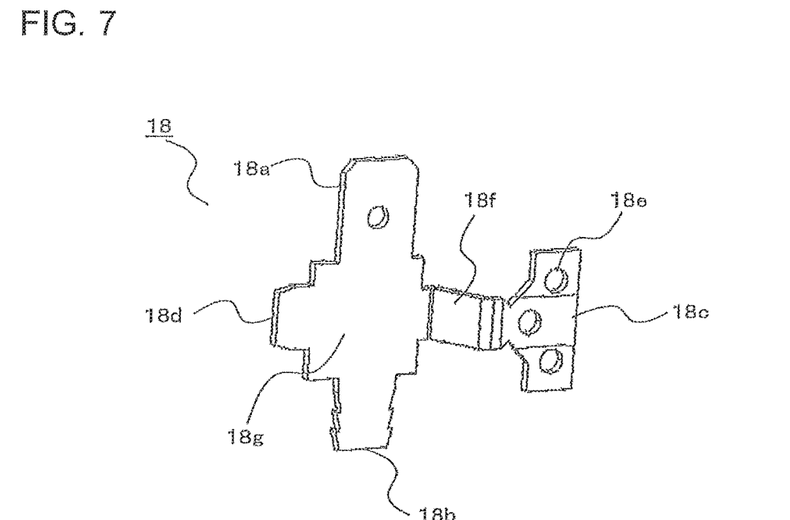
FIG. 7 is a perspective view of a terminal n Embodiment of the present invention.

FIG. 7 is a perspective view of one of the terminals 18 in Embodiment of the present invention.

As illustrated in FIG. 7, each terminal 18 is formed in a substantially cross shape and has four protrusions extending from a substrate 18g in four directions. The four protrusions are formed of the external-power-supply connection portion 18a to be connected to a three-phase external power supply, a permanent press-fitting portion 18b for press-fitting the terminal 18 into the permanent securing protrusion 163b of the insulator 16 before molding of the stator 2, the tie portion 18c to which the coil terminal line 17a is tied and joined with solder, and a temporary press-fitting portion 18d for temporarily securing the terminal 18 to the temporary securing protrusion 163a when the coil terminal line 17a is joined to the tie portion 18c with solder.

Each external-power-supply connection portion 18a is formed in a substantially rectangular plate shape and has a circular opening for connecting a wire at the center.

Each permanent press-fitting portion 18b is located so as to oppose the external-power-supply connection portion 18a, is formed in a substantially rectangular plate shape, and has protrusions at opposing side portions.

Each tie portion 18c is formed with a terminal arm 18f that tilts in the outer circumference direction of the stator 2 interposed between the tie portion 18c and the substrate 18g, and in the tie portion 18c, for example, three terminal-line insertion holes 18e are formed. As illustrated in FIG. 4, the tie portion 18c is formed so as to be bent with respect to the terminal arm 18f in the inner circumferential direction of the stator 2.

Each temporary press-fitting portion 18d is located so as to oppose the tie portion 18c and is formed such that the temporary press-fitting portion 18d is shorter than the permanent press-fitting portion 18b in the direction toward the end thereof.

A process of soldering the coil terminal lines 17a to the terminals 18 will now be described with reference to FIG. 8 and FIG. 9.

Figure 8:
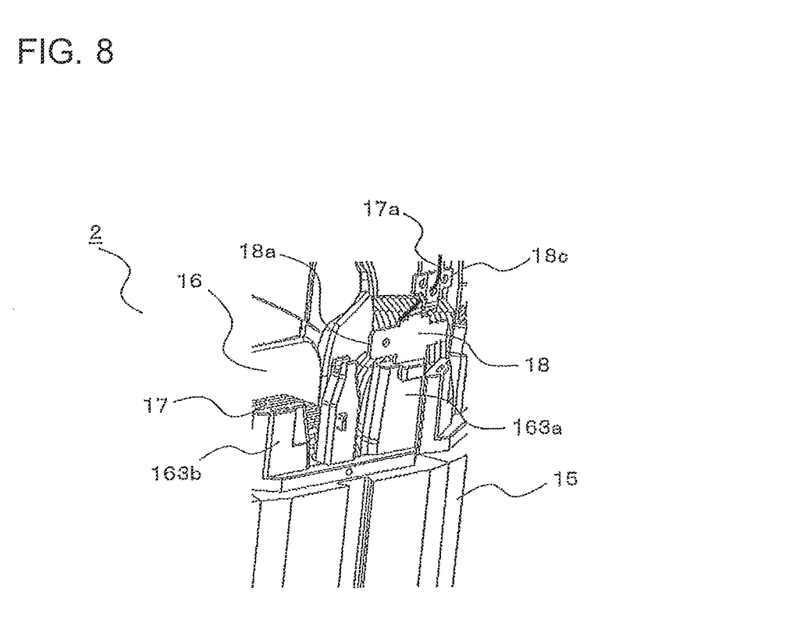
FIG. 8 is a perspective view of a principal part of the stator in Embodiment of the present invention in a state in which terminals are temporarily secured to the stator before molding.

FIG. 8 is a perspective view of a principal part of the stator 2 in Embodiment of the present invention in a state in which the terminals 18 are temporarily secured to the stator 2 before molding.

Figure 9:
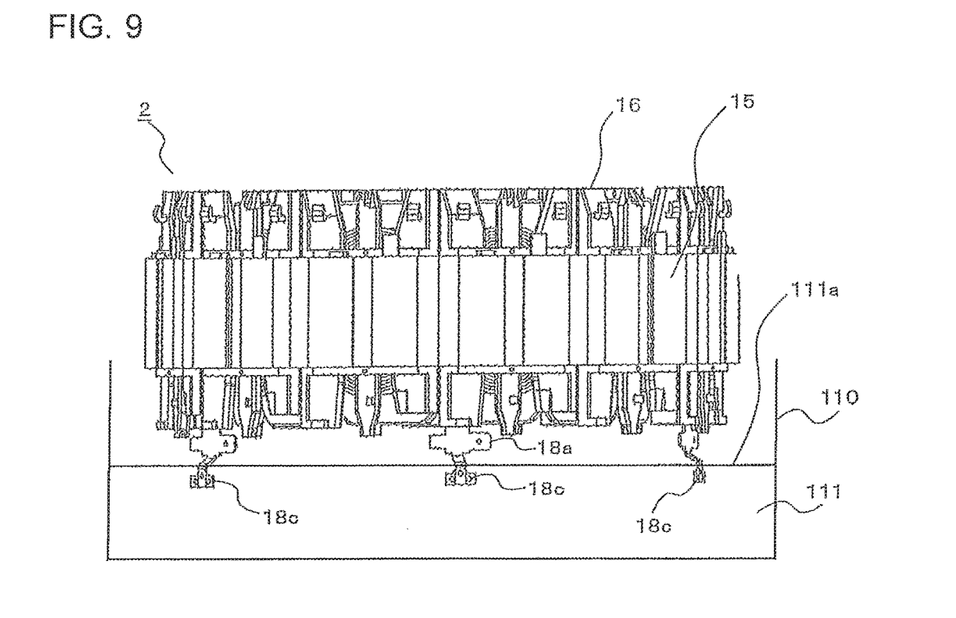
FIG. 9 is a schematic view of the stator in Embodiment of the present invention in a state in which part of the stator is immersed into a solder bath.

FIG. 9 is a schematic view of the stator 2 in Embodiment of the present invention in a state in which part of the stator 2 is immersed into a solder bath.

Figure 10:
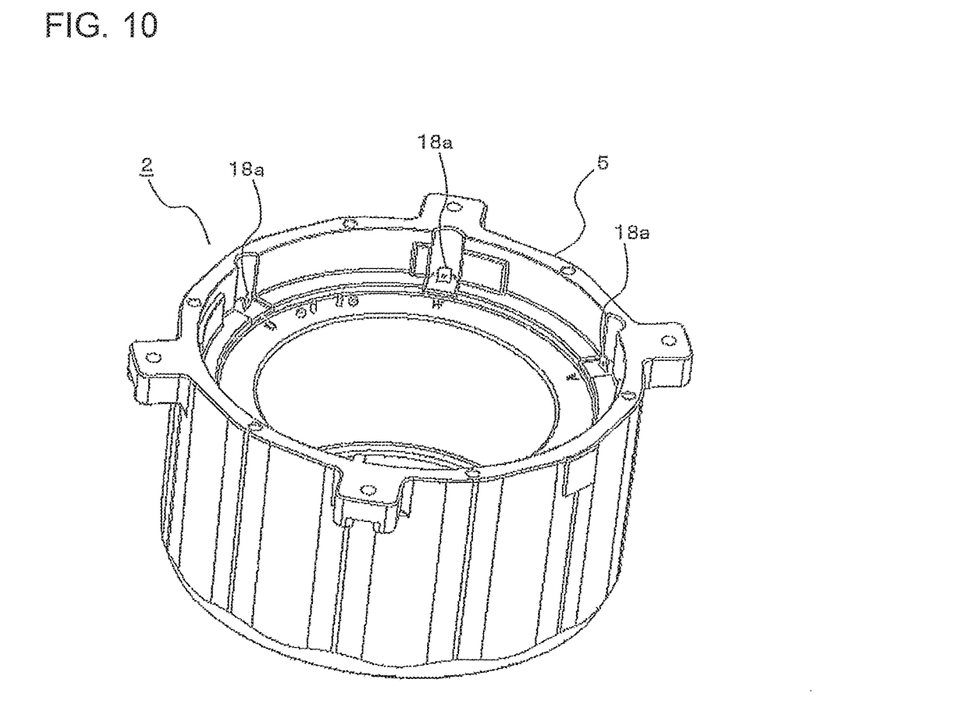
FIG. 10 is a perspective view of the stator in Embodiment of the present invention after molding.

FIG. 10 is a perspective view of the stator 2 in Embodiment of the present invention after molding.

When the coil terminal lines 17a are soldered to the terminals 18 of the stator 2 according to Embodiment, as illustrated in FIG. 8, the temporary press-fitting portions 18d of the terminals 18 are first inserted into and temporarily secured in the temporary engagement holes 163e of the temporary securing protrusions 163a of the insulators 16.

The coil terminal lines 17a whose coating is separated are subsequently tied and secured to the tie portions 18c of the terminals 18.

The stator 2 is horizontally held with the tie portions 18c of the terminals 18 in the stator 2 facing downward and is lowered into a solder bath 110 in a state illustrated in FIG. 9 to immerse the tie portions 18c (3 tie portions in Embodiment) into the solder bath 110 at the same time.

At this time, the tie portions 18c are located closest to a solder liquid surface 111a among parts of the terminals 18, and accordingly, only the tie portions 18c can be immersed into solder 111.

Thus, the solder 111 is not attached to the external-power-supply connection portions 18a. This is done to prevent an increase in the thickness of plate materials due to attachment of solder to the external-power-supply connection portions 18a and prevent terminal caps, for example, from failing to cover the external-power-supply connection portions 18a during molding. This is done also to prevent a connection failure when the external-power-supply connection portions 18a are connected to wires extending from the external power supply by using, for example, press-fit terminals.

After soldering between the tie portions 18c and the coil terminal lines 17a is finished, the terminals 18 that are temporarily press-fitted are extracted and rotated at an angle of 90° to press-fit the permanent press-fitting portions 18b of the terminals 18 into the permanent engagement holes 163d of the permanent securing protrusions 163b of the insulators 16, as illustrated in FIG. 4.

In this state, the stator 2 is integrally molded with a resin molding material. Consequently, as illustrates in FIG. 10, the tie portions 18c are buried in the molding material, and the external-power-supply connection portions 18a are exposed from the molding material.

This is done because it is necessary for the tie portions 18c to be buried in the resin molding material to prevent corrosion due to, for example, water. This is done also because it is necessary for the external-power-supply connection portions 18a to be connected to wires extending from the external power supply by using, for example, press-fit terminals to supply electric power to the coils 17 of the stator 2, although the stator 2 itself is molded and insulated.

The length of the temporary press-fitting portions 18d of the terminals 18 that are to be press-fitted is less than the length of the permanent press-fitting portions 18b that are to be press-fitted, with respect to the direction of the press-fitting, as described above. Accordingly, a force needed to extract and insert the temporary press-fitting portions 18d is small, and operability of the extraction and insertion is improved. In addition, during the extraction and insertion of the temporary press-fitting portions 18d, a force by which the temporary press-fitting portions 18d temporarily secured are extracted is inhibited from being applied to the insulators 16 and the tie portions 18c joined with solder, and accordingly, the quality of the stator 2 is not reduced.

Furthermore, when the terminals 18 are temporarily secured before molding, looseness of the coil terminal lines 17a is reduced. This saves time and effort to arrange the coil terminal lines 17a such that the coil terminal lines 17a are buried in the molding material and improves operability.

The tie portions 18c of the terminals 18 have the terminal-line insertion holes 18e through which the coil terminal lines 17a pass, and accordingly, the coil terminal lines 17a are readily tied to the terminals 18 that have been temporarily press-fitted into the temporary securing protrusions 163a.

Furthermore, the positions of portions at which the coatings of the coil terminal lines 17a are separated are readily adjusted to tie the coil terminal lines 17a through the terminal-line insertion holes 18e. Accordingly, in the case where the tie portions 18c are immersed into the solder bath 110, the portions at which the coatings are separated and the tie portions 18c are joined with solder with certainty, and all of the portions at which the coatings are separated can be covered by solder.

As illustrated in FIG. 4, the tie portions 18c are bent with respect to the terminal arms 18f in the inner circumferential direction of the stator 2. Bending the tie portions 18c in this way enables the degree to which the tie portions 18c protrude in the outer circumferential direction of the stator 2 to be reduced. In this case, the degree of protrusion of the tie portions 18c protruding in the outer circumferential direction, from among the components of the stator 2, is reduced to reduce the maximum radius of the outer circumference of the stator 2. Accordingly, the radius of the corresponding casing 5 can be reduced, and the amount of a resin molding material with which the inside of the casing 5 is filled can be reduced.

As illustrated in FIG. 4, each insulator 16 includes the temporary securing protrusion 163a and the permanent securing protrusion 163b as separated bodies. Accordingly, the temporary engagement holes 163e in which the temporary press-fitting portions 18d of the terminals 18 have been inserted and the permanent engagement holes 163d in which the permanent press-fitting portions 18b of the terminals 18 are to be inserted can be used in different ways. This prevents the terminals 18 from being extracted while the terminals 18 are being permanently secured as a result of the engagement holes being widened when the terminals 18 are temporarily secured.

The height dimension of the temporary securing protrusions 163a in the axial direction of the annular stator 2 is more than the height dimension of the permanent securing protrusions 163b in the axial direction of the annular stator 2. Accordingly, the tie portions 18c are readily immersed into the solder bath in the case where the terminals 18 are temporarily secured to the temporary securing protrusions 163a.

In an example described above, the temporary securing protrusions 163a and the permanent securing protrusions 163b are formed on the insulators 16 as separated bodies, but these may be shared considering the cost. In this case, the permanent engagement holes 163d and the temporary engagement holes 163e may be formed as separated holes, or may be shared.

REFERENCE SIGNS LIST 1 rotary electric motor 2 stator 3 rotor 4 motor housing casing 5a bearing insertion portion 6 insulation bracket 6a bearing insertion portion 7 metal plate bracket 8 bracket cover 9 rotating body 10 permanent magnet 11 shaft 12 bearing 13 printed circuit board 14 printed circuit board holder 15 stator core insulator 17 coil 17a coil terminal line 18 terminal 18a external-power-supply connection portion 18b permanent press-fitting portion 18c tie portion 18d temporary press-fitting portion 18e terminal-line insertion hole 18f terminal arm 18g substrate 100 propeller fan 110 solder bath 111 solder 111a solder liquid surface 151 back yoke portion 152 tooth portion 152a tooth base 152b tooth end portion 161 substrate portion 162 inner-circumference protruding portion 163 outer-circumference protruding portion 163a temporary securing protrusion 163b permanent securing protrusion 163c central protrusion 163d permanent engagement hole 163e temporary engagement hole 164 fitting portion

The invention claimed is:
1. A rotary electric motor comprising:
an annular stator;
a rotor rotatably held on an inner circumferential side of the stator;
a plurality of stator cores forming the stator;
insulators attached to the stator cores and formed of an insulating material;
coils wound around the insulators; and
a plurality of terminals to which coil terminal lines of the coils are connected,
each of the terminals including at least two protrusions protruding from a substrate,
the at least two protrusions comprising
a permanent press-fitting portion for press-fitting one of the terminals into corresponding one of the insulators and
a temporary press-fitting portion for temporarily press-fitting the one of the terminals when the corresponding one of the coil terminal lines is joined to the one of the terminals with solder.
2. The rotary electric motor of claim 1, wherein a permanent securing protrusion engaged with the permanent press-fitting portion and a temporary securing protrusion to be engaged with the temporary press-fitting portion are formed on each of the insulators.
3. The rotary electric motor of claim 2, wherein the temporary securing protrusion is longer than the permanent securing protrusion in an axial direction of the annular stator.
4. The rotary electric motor of claim 1, wherein the temporary press-fitting portion is shorter than the permanent press-fitting portion in a press-fitting direction.
5. A rotary electric motor comprising:
an annular stator;
a rotor rotatably held on an inner circumferential side of the stator;
a plurality of stator cores forming the stator;
insulators attached to the stator cores and formed of an insulating material;
coils wound around the insulators; and
a plurality of terminals to which coil terminal lines of the coils are connected, each of the terminals including four protrusions protruding from a substrate, and the four protrusions comprising
- an external-power-supply connection portion to be connected to an external power supply,
- a permanent press-fitting portion for press-fitting one of the terminals into the corresponding one of the insulators,
- a tie portion to which corresponding one of the coil terminal lines is tied and joined with solder, and
- a temporary press-fitting portion for temporarily press-fitting the one of the terminals into the corresponding one of the insulators when the corresponding one of the coil terminal lines is joined to the tie portion.

6. The rotary electric motor of claim 5, wherein a plurality of terminal-line insertion holes are formed in the tie portion.

7. The rotary electric motor of claim 5, wherein the tie portion is connected to the substrate with a terminal arm interposed therebetween, and wherein the tie portion is bent with respect to the terminal arm in an inner circumferential direction of the stator.

8. A method of manufacturing a rotary electric motor including stator cores, insulators attached to the stator cores, coils wound around the insulators, and a plurality of terminals to which terminal lines of the coils are connected, the method comprising:

- temporarily securing the plurality of terminals to temporary securing protrusions of the insulators;
- tying the terminal lines of the coils to tie portions of the plurality of terminals;
- immersing the tie portions of the plurality of terminals into solder;
- detaching the plurality of terminals from the temporary securing protrusions;
- permanently securing the plurality of terminals to permanent securing protrusions of the insulators; and
- burying the tie portions in a resin molding material with external-power-supply connection portions of the plurality of terminals exposed.

* * * * *